(12) United States Patent
Watts

(10) Patent No.: US 10,669,073 B1
(45) Date of Patent: Jun. 2, 2020

(54) APPARATUS, SYSTEM, AND METHOD FOR PREVENTING ANIMAL SUFFOCATION

(71) Applicant: Scarlett Dawn Watts, Fort Lauderdale, FL (US)

(72) Inventor: Scarlett Dawn Watts, Fort Lauderdale, FL (US)

( * ) Notice: Subject to any disclaimer, the term of this patent is extended or adjusted under 35 U.S.C. 154(b) by 0 days.

(21) Appl. No.: 16/511,072

(22) Filed: Jul. 15, 2019

(51) Int. Cl.
| B65D 33/01 | (2006.01) |
| A61D 99/00 | (2006.01) |
| A01K 29/00 | (2006.01) |

(52) U.S. Cl.
CPC .............. *B65D 33/01* (2013.01); *A01K 29/00* (2013.01); *A61D 99/00* (2013.01)

(58) Field of Classification Search
CPC ........ A62B 17/08; A62B 18/06; B65D 33/01; B65D 79/005; B65D 17/30; B65D 17/42; B68C 5/00
USPC ...................................... 454/334; 128/206.28
See application file for complete search history.

(56) References Cited

U.S. PATENT DOCUMENTS

| 2,811,966 | A | * | 11/1957 | Hull | ......................... | A61D 7/04 |
| | | | | | | 128/201.23 |
| 2,843,119 | A | * | 7/1958 | Glasser | .................... | A61D 7/04 |
| | | | | | | 128/205.17 |
| 3,085,608 | A | | 4/1963 | Mathues | | |
| 3,209,804 | A | * | 10/1965 | Walker | ................. | B65D 31/147 |
| | | | | | | 383/58 |
| 3,430,842 | A | | 3/1969 | Yamaguchi | | |
| 3,505,998 | A | * | 4/1970 | Brown | ...................... | A61D 7/04 |
| | | | | | | 128/207.11 |
| 3,762,407 | A | | 10/1973 | Shonerd | | |
| 3,939,995 | A | | 2/1976 | Baxter | | |
| 4,169,428 | A | | 10/1979 | Waugh | | |
| 4,546,768 | A | * | 10/1985 | Ferierabend | ............. | A61D 7/04 |
| | | | | | | 128/200.16 |
| 4,622,964 | A | | 11/1986 | Flynn | | |
| 4,674,532 | A | | 6/1987 | Koyanagi | | |
| 4,726,174 | A | * | 2/1988 | Wilson | .................... | A62B 18/06 |
| | | | | | | 128/207.11 |

(Continued)

FOREIGN PATENT DOCUMENTS

| CN | 205396907 | 6/2016 |
| CN | 106965968 | 7/2017 |

(Continued)

OTHER PUBLICATIONS

CN 106965968A: Li Hongjiang, Grain food preservation air bag and use method, Mar. 17, 2017, pertinent pages are pp. 6-8 of 11 (Year: 2017).*

*Primary Examiner* — Edelmira Bosques
*Assistant Examiner* — Frances F. Hamilton
(74) *Attorney, Agent, or Firm* — Derek Fahey

(57) ABSTRACT

A system for preventing animal suffocation because of a bag is disclosed. The system includes an attachment for the bag having a first panel and a second panel. A hinge element attaches the first panel with the second panel. The first panel is configured to attach to a first outward facing portion of the bag and the second panel and is configured to attach to a second outward facing portion of the bag. A one-way air flow valve is integral with at least one of the first panel and the second panel and is configured to allow air to flow from an outside environment into the bag only when an inward force acts on the valve and pulls air from outside the bag inward inside the bag.

13 Claims, 17 Drawing Sheets

(56) References Cited

U.S. PATENT DOCUMENTS

| | | | |
|---|---|---|---|
| 5,254,074 A | 10/1993 | Landers et al. | |
| 5,451,179 A | 9/1995 | LaRoi, Jr. et al. | |
| 5,454,642 A * | 10/1995 | De Luca | B65D 81/052 |
| | | | 206/522 |
| 5,469,966 A | 11/1995 | Boyer | |
| 5,839,436 A | 11/1998 | Fangrow, Jr. et al. | |
| 6,129,081 A | 10/2000 | Wu | |
| 6,341,606 B1 * | 1/2002 | Bordewick | A61M 16/0688 |
| | | | 128/206.25 |
| 7,013,896 B2 * | 3/2006 | Schmidt | A61M 16/06 |
| | | | 128/203.29 |
| 7,244,223 B2 | 7/2007 | Hartman et al. | |
| 7,513,481 B2 | 4/2009 | Su | |
| 7,967,166 B2 | 6/2011 | Pham et al. | |
| 8,328,159 B2 | 12/2012 | Lee | |
| 9,126,004 B2 * | 9/2015 | Flynn, Sr. | A61M 16/0078 |
| 10,160,585 B2 * | 12/2018 | Frayne | B31D 5/0073 |
| 10,329,053 B2 * | 6/2019 | Steele | B65D 31/147 |
| 2003/0075218 A1 | 4/2003 | Lau | |
| 2004/0173564 A1 * | 9/2004 | Montserrat-Marsal | |
| | | | B65D 79/005 |
| | | | 215/271 |
| 2007/0241023 A1 | 10/2007 | Ootsubo et al. | |
| 2007/0292055 A1 | 12/2007 | Reuhs et al. | |
| 2011/0182531 A1 * | 7/2011 | Steele | B65D 31/147 |
| | | | 383/41 |
| 2011/0203590 A1 * | 8/2011 | Unger | A62B 9/02 |
| | | | 128/205.24 |
| 2012/0203125 A1 * | 8/2012 | Moran | A61D 7/04 |
| | | | 600/532 |
| 2014/0261398 A1 * | 9/2014 | James | A61D 7/04 |
| | | | 128/200.16 |
| 2015/0231421 A1 * | 8/2015 | Berney-Smith | A62B 9/006 |
| | | | 128/202.13 |
| 2017/0174416 A1 * | 6/2017 | Catozzi | B65D 75/008 |
| 2019/0168942 A1 * | 6/2019 | Fang | B65D 77/065 |

FOREIGN PATENT DOCUMENTS

| | | | | |
|---|---|---|---|---|
| DE | 582143 C | * | 8/1933 | ............ A62B 18/06 |
| DE | 202014104845 | | 1/2016 | |
| FR | 563791 A | * | 12/1923 | ................ D01C 1/02 |
| GB | 111746 A | * | 12/1917 | ............ A62B 18/06 |
| GB | 2475499 A | * | 5/2011 | ............ A01K 25/00 |

* cited by examiner

APPARATUS, SYSTEM, AND METHOD FOR PREVENTING ANIMAL SUFFOCATION

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of animal safety, and more specifically to systems and methods for preventing animal suffocation from bags or containers.

BACKGROUND

Pet suffocation is a serious concern. Many people do not realize that pets, no matter their size or strength, can have a hard time getting bags or containers off their head once they are stuck. Not only do dogs and cats lack thumbs to help them grab and remove the bag or container, but the bag or container quickly forms a vacuum-like seal around their head as they breathe in and quickly deplete the air within the bag or container. As this happens, the oxygen levels quickly decline, and the carbon dioxide levels quickly rise. The entrapped pet panics from not being able to breathe normally and eventually dies from asphyxiation.

Not surprisingly, 3 to 5 pets suffocate from bags or containers each week in the United States. According to a recent survey of 1,354 respondents whose pets suffocated in bags or containers, 72 percent of pets suffocated in chip or snack bags, with the remainder, as a result of a pet food or treat bag, liners of cereal boxes, bread containers or other plastic containers. Approximately 25 percent of the bags or containers had been in or near the garbage, 22 percent on a coffee or side table, 13 percent on the counter, 6 percent outside, 6 percent on the kitchen or dining table, 3 percent in or near the recycling bin, 20 percent in other known locations, and 5 percent in unknown locations. Additionally, 39 percent of respondents were home when the pet suffocated. Of those who were out, 18 percent were gone for less than 15 minutes.

As a temporary solution, the American Veterinary Medical Association (AVMA) recommends storing food in plastic containers with an opening too small for a pet's head, serving snacks in a bowl rather than eating them out of a bag, and cutting bags along one side and the bottom before disposal. Nevertheless, the AVMA fails to address the need for a safe and convenient solution to prevent pet suffocation.

Therefore, a need exists to improve over the prior art and more particularly, for a safety device that prevents animal suffocation because of a bag or container.

SUMMARY

An apparatus, system, and method for preventing animal suffocation is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for preventing animal suffocation because of a bag is disclosed. The system includes an attachment for the bag. The attachment comprises a first panel having a first side and a second side, and a second panel having a first side and a second side. A hinge element hingedly attaches the first panel with the second panel. A first amount of adhesive is disposed on the first side of the first panel. The first amount of adhesive is configured to attach the first side of the first panel to a first outward facing portion of the bag. A second amount of adhesive is disposed on the first side of the second panel. The second amount of adhesive is configured to attach the first side of the second panel to a second outward facing portion of the bag. The attachment further includes a one-way air flow valve that is integral with at least one of the first panel and the second panel. The one-way valve is configured to allow air to flow from an outside environment into the bag only when an inward force acts on the valve and pulls air from outside the bag inward inside the bag. Additionally, the one-way air flow valve prevents air from flowing from inside the bag to outside the bag.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
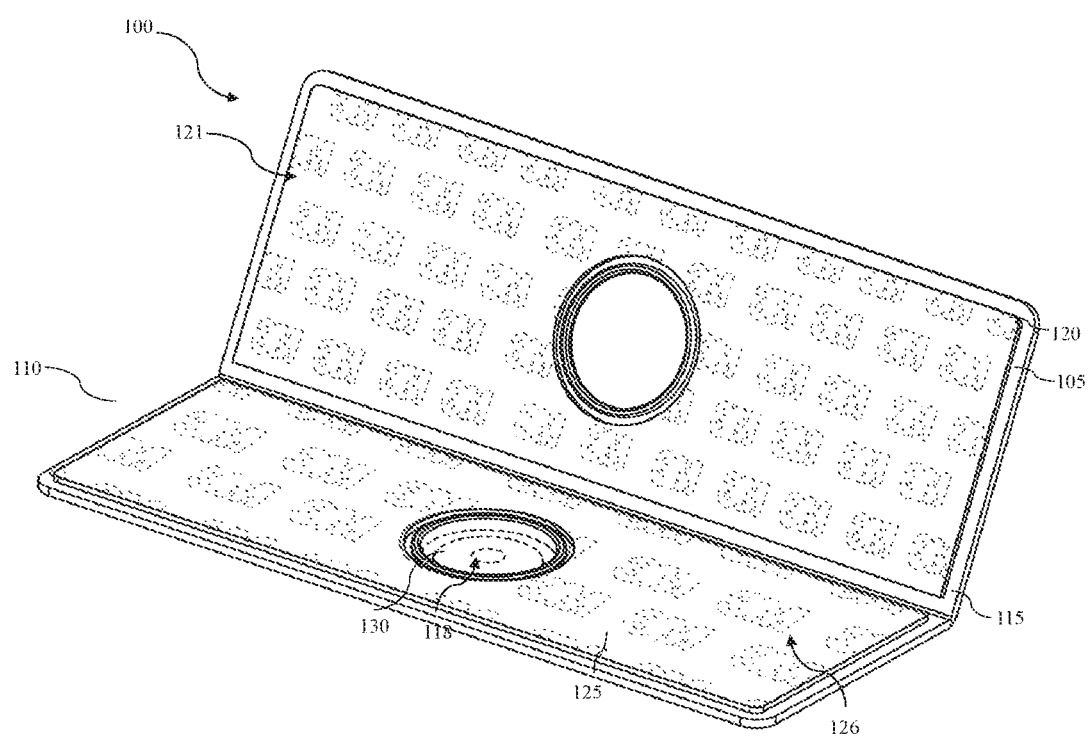
FIG. 1 is a front isometric view of a system for preventing animal suffocation because of a bag, according to an example embodiment of the present invention.
Figure 2:
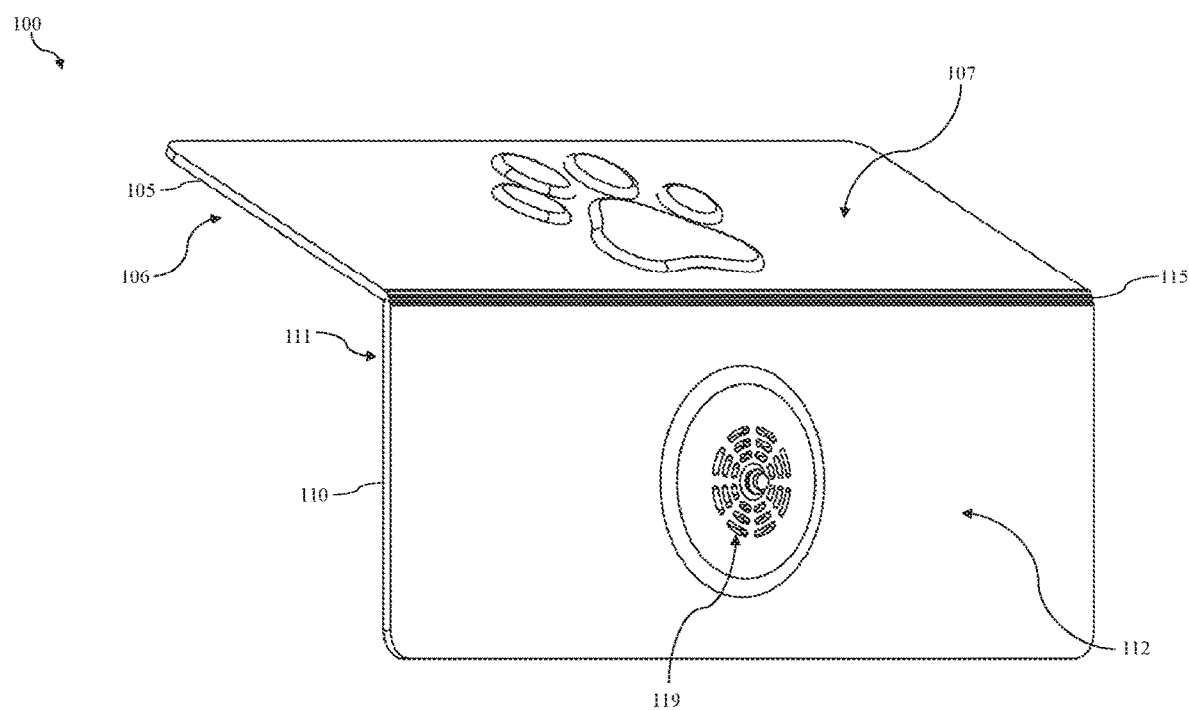
FIG. 2 is a rear isometric view of a system for preventing animal suffocation because of a bag, according to an example embodiment of the present invention.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The present invention improves upon the prior art by providing a system for preventing animal suffocation because of a bag. A one-way valve is configured to allow air to flow from an outside environment into a bag or container only when an inward force acts on the valve and pulls air from outside the bag or container inward inside the bag or container. As a result, suffocation of an animal that has its head stuck in the bag or container is prevented because the inward force caused by the lung power of the animal acting on the one-way air flow valve allows air to enter the bag or container.

Referring now to the Figures. FIGS. 1-10 illustrate a system for preventing animal suffocation because of a bag according to an example embodiment of the present invention and will be discussed together for ease of reference. Although the examples given describe the system relative to a bag, those of skill in the art will appreciate that the invention may be adapted for use with other containers, receptacles, and enclosures configured for holding a product used in storage, packaging, and shipping.

Figure 3:
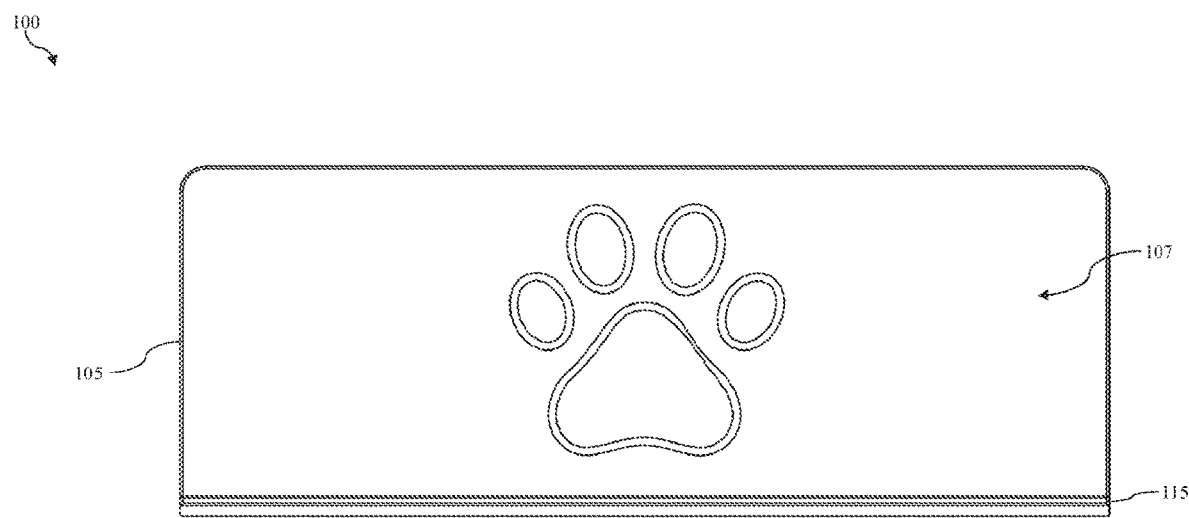
FIG. 3 is a rear view of the first panel in FIG. 2, according to an example embodiment of the present invention.
Figure 4:
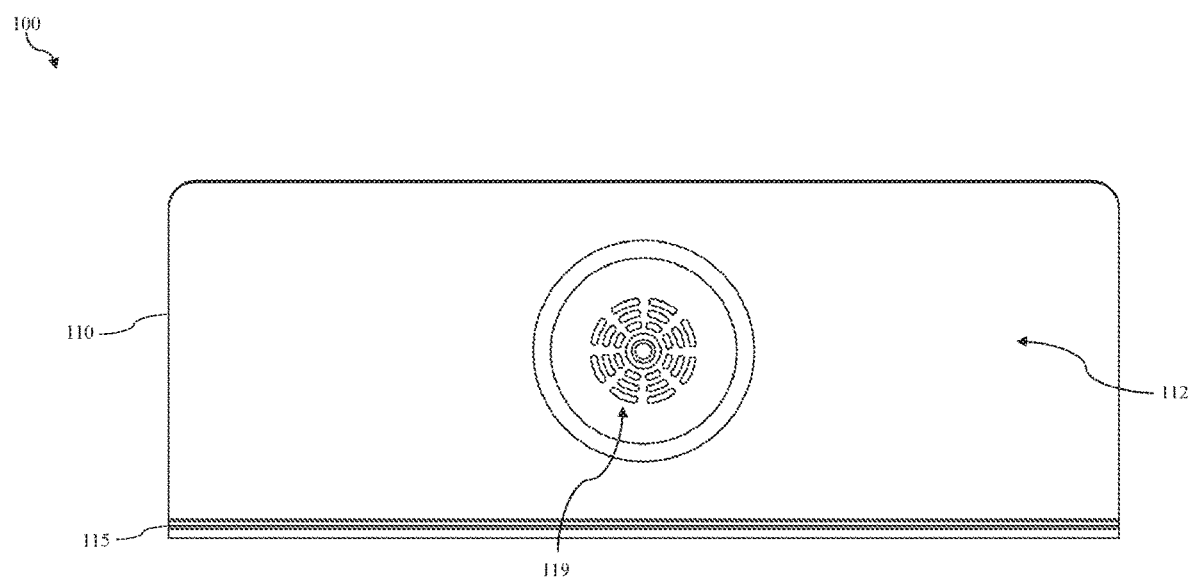
FIG. 4 is a rear view of the second panel in FIG. 2, according to an example embodiment of the present invention.
Figure 5:
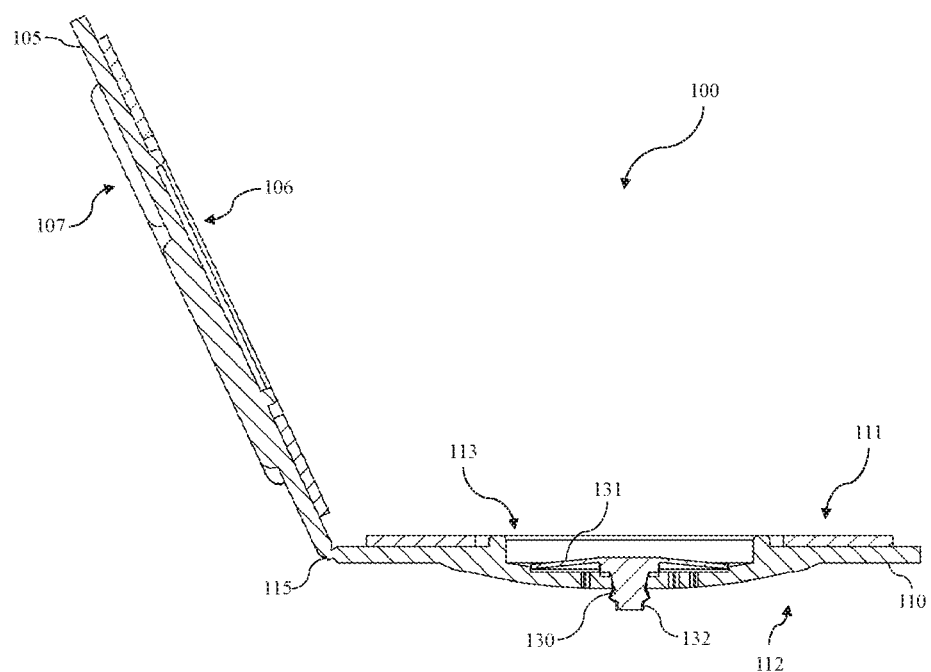
FIG. 5 is a cross-sectional side view of a system for preventing animal suffocation because of a bag, according to an example embodiment of the present invention.

The system includes an attachment 100 for a bag 101 comprising a first panel 105 and a second panel 110. The first panel has a substantially planar rectangular shaped body comprising a first side 106 and a second side 107 and the second panel has a substantially planar rectangular shaped body having a first side 111 and a second side 112. In the present embodiment, an annular ring 113 is embedded on the center of the first side 111 of the second panel. A planar annular valve seat 114 is formed about the periphery of the annular ring. As described more fully below, the planar annular valve seat includes a circular hole 118 for receiving a one-way air flow valve, and a plurality of slots 119 for permitting air to flow into the bag. As best shown in FIG. 3, the second side of the first panel and the second side of the second panel may have a dedicated area for adding a message, logo or other personalized item. It should also be appreciated that the first panel and the second panel can have other shapes and dimensions, and such variations are within the spirit and scope of the claimed invention. The first panel and second panel may be comprised from any elastomeric thermoplastic material (plasticized PVC, thermoplastic rubber, polyurethane, etc.) or vulcanizable material (natural or synthetic rubber, neoprene, EPDM, solid or liquid silicone rubber, etc.).

The attachment 100 further includes a hinge element 115 for hingedly attaching the first panel 105 with the second panel 110. In the present embodiment, the hinge element is a plastic living hinge that is integral with and of unitary construction with the first panel and the second panel. A living hinge is a thin flexible hinge made from the same material as the two rigid pieces it connects and is configured to allow the rigid pieces to bend along the line of the hinge. The first panel and the second panel being hingedly attached and attached to the container of bag provides structural support to the bag or container to allow the one-way air flow valve to properly function. Specifically, the structural support from the first and second panel prevents a first outward facing portion 102 of the bag from sticking to a second outward facing portion of the bag 101 to provide ample clearance for the animal's lung power to pull air into the bag (further explained below). It should be appreciated that other suitable hinge mechanisms are within the spirit and scope of the claimed invention. In another embodiment (not shown), the attachment may be configured to comprise only a single panel, without requiring the use of a second panel or hinge element. For example, the container may also be a rigid cylindrical shaped body that allows the panel to be attached to the body of the container. The panel may be a rigid panel and in some embodiments the panel may be flexible so that the panel may be attached to a panel having a curved surface.

A first amount of adhesive 120 is disposed on the first side 106 of the first panel 105. The first amount of adhesive is configured to attach the first side of the first panel to a first outward facing portion 102 of the bag 101. A first removable backing 121 covers the first amount of adhesive 120. Similarly, a second amount of adhesive 125 is disposed on the first side 1 of the second panel 110. The second amount of adhesive is configured to attach the first side of the second panel to a second outward facing portion 103 of the bag 101. A second removable backing 126 covers the second amount of adhesive. In the present embodiment, the first amount of adhesive 120 and the second amount of adhesive 125 is a double-sided adhesive tape, however, it should be appreciated that other suitable adhesives are within the spirit and scope of the claimed invention. Additionally, it should be understood that multiple peel off layers may be stacked on either the first panel and second panel so that each panel may be attached onto the container.

Figure 6:
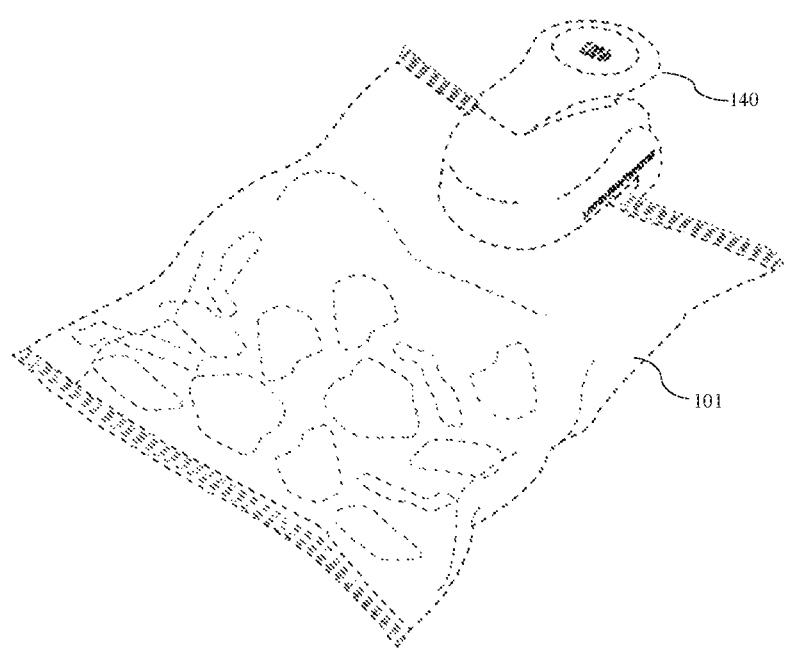
FIG. 6 is a perspective view of a tool for creating a hole on a bag, according to an example embodiment of the present invention.
Figure 7:
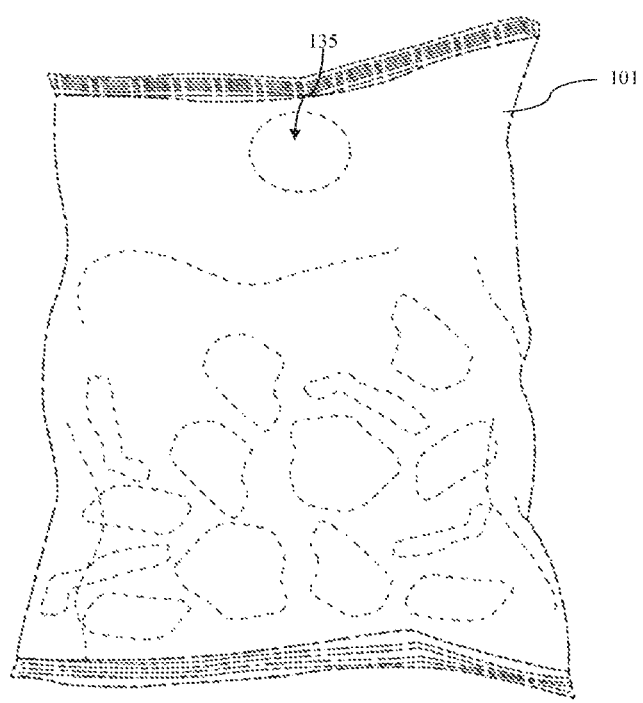
FIG. 7 is a perspective view of a perforated bag, according to an example embodiment of the present invention.
Figure 8:
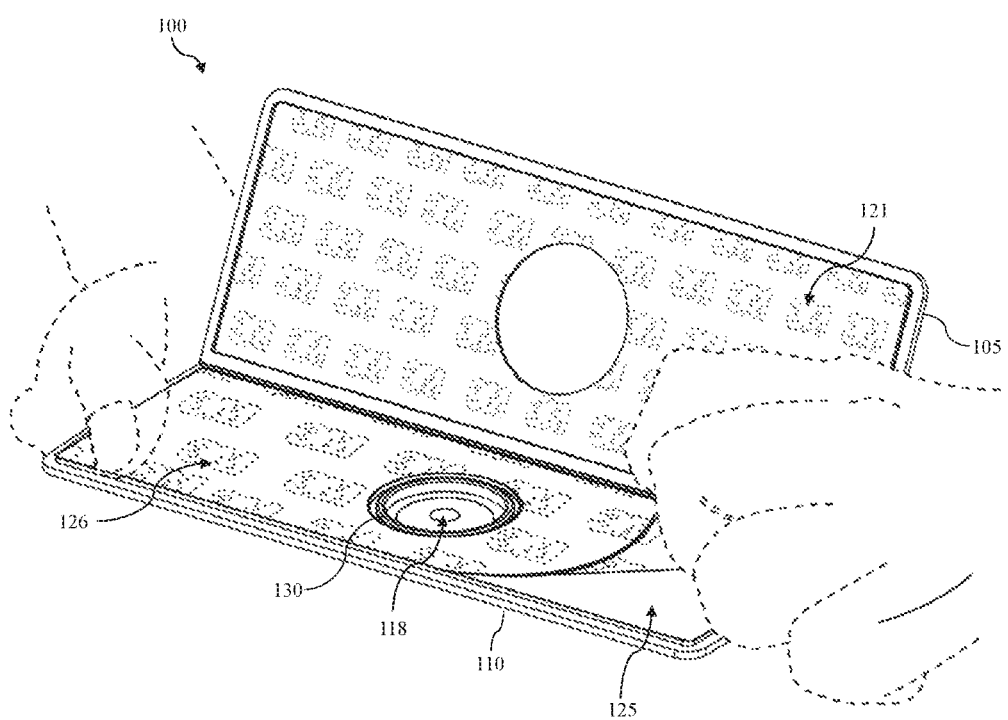
FIG. 8 is a perspective view of a system for preventing animal suffocation because of a bag, wherein a user is removing a removable backing from the adhesive disposed on the second panel, according to an example embodiment of the present invention.
Figure 9:
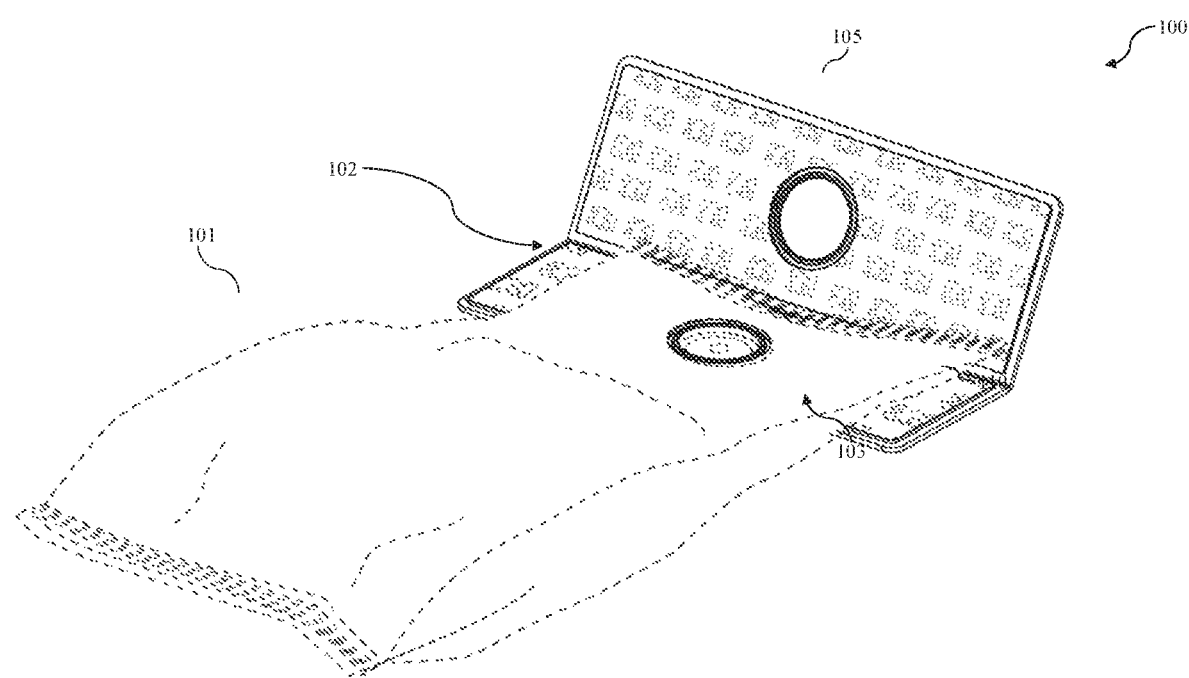
FIG. 9 is a perspective view of a system for preventing animal suffocation because of a bag, wherein the attachment is in an open configuration, according to an example embodiment of the present invention.
Figure 10:
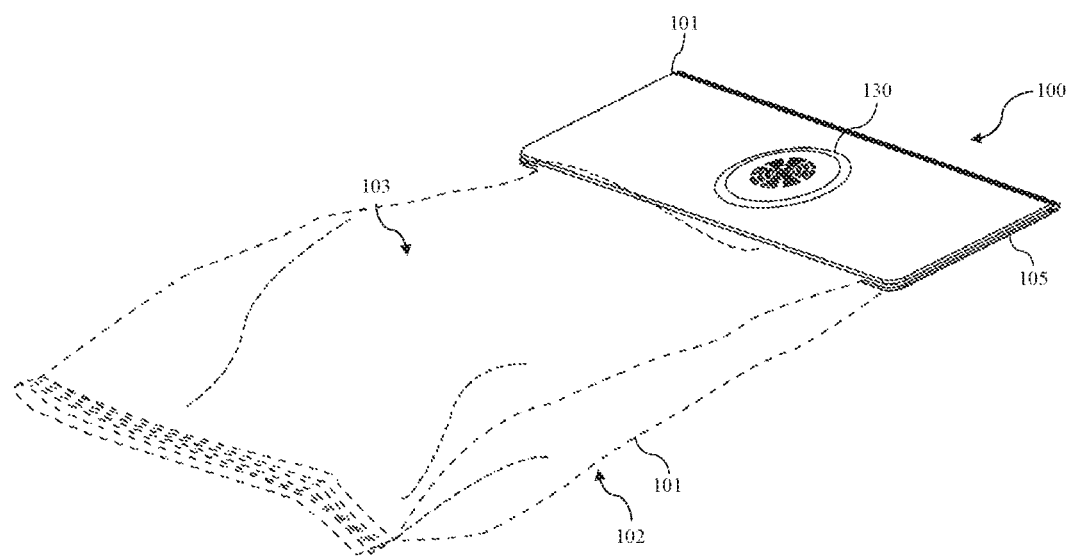
FIG. 10 is a perspective view of a system for preventing animal suffocation because of a bag, wherein the attachment is in a closed configuration, according to an example embodiment of the present invention.
Figure 11:
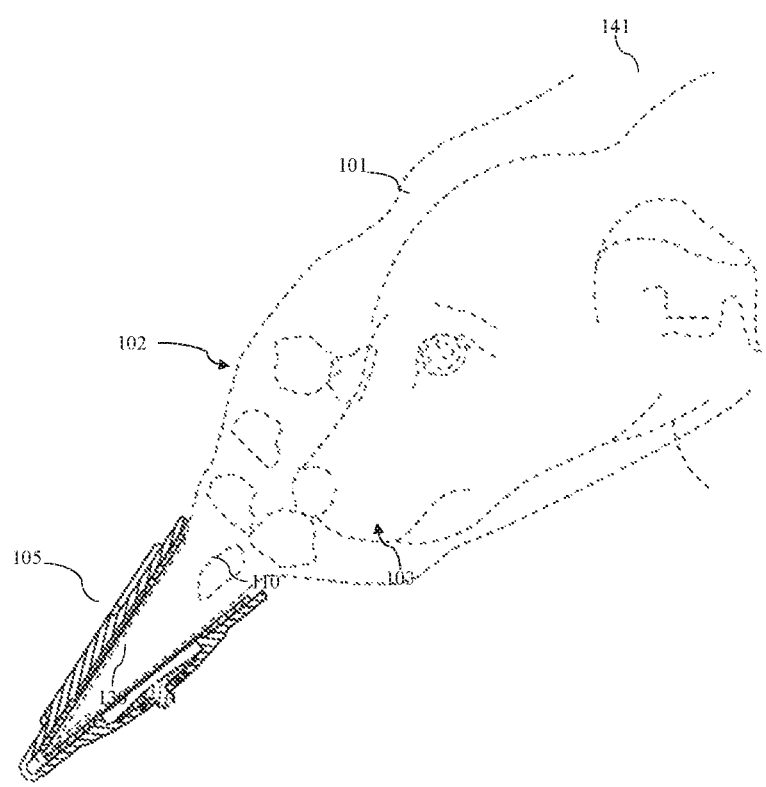
FIG. 11 is a side view of a system for preventing animal suffocation because of a bag, wherein an animal has its head stuck in a bag, according to an example embodiment of the present invention.

The attachment further includes a one-way air flow valve 130 that is integral with at least one of the first panel and the second panel. The one-way air flow valve is positioned over a hole 135 on the bag. In the present embodiment, the hole 135 is positioned proximate to the one-way flow valve 130 so that air flows from the outside environment to inside the bag. As illustrated in FIGS. 6 and 7, the tool 140 for creating the hole 135 on the bag 101 is a hole puncher capable of perforating a circular hole through a typical potato chip bag that is made up of multiple layers of polymer materials; biaxially oriented polypropylene (BOPP) on the inside, low-density polyethylene (LDPE) in the middle, another middle layer of BOPP, and an outer layer of Surlyn®, a thermoplastic resin. It should be appreciated that the hole on the bag can have a variety of cross-sectional shapes and configurations, and such variations are within the spirit and scope of the claimed invention. The one-way air flow valve 130 is configured to allow air to flow from an outside environment into the bag only when an inward force acts on the valve and pulls air from outside the bag inward inside the bag. The inward force defines a minimum threshold at least as great as an inhaling force caused by the animal 141 inhaling. Therefore, the one-way air flow valve 130 will prevent air from flowing into the bag 101 if the inward force does not act on the one-way air flow valve.

Figure 12:
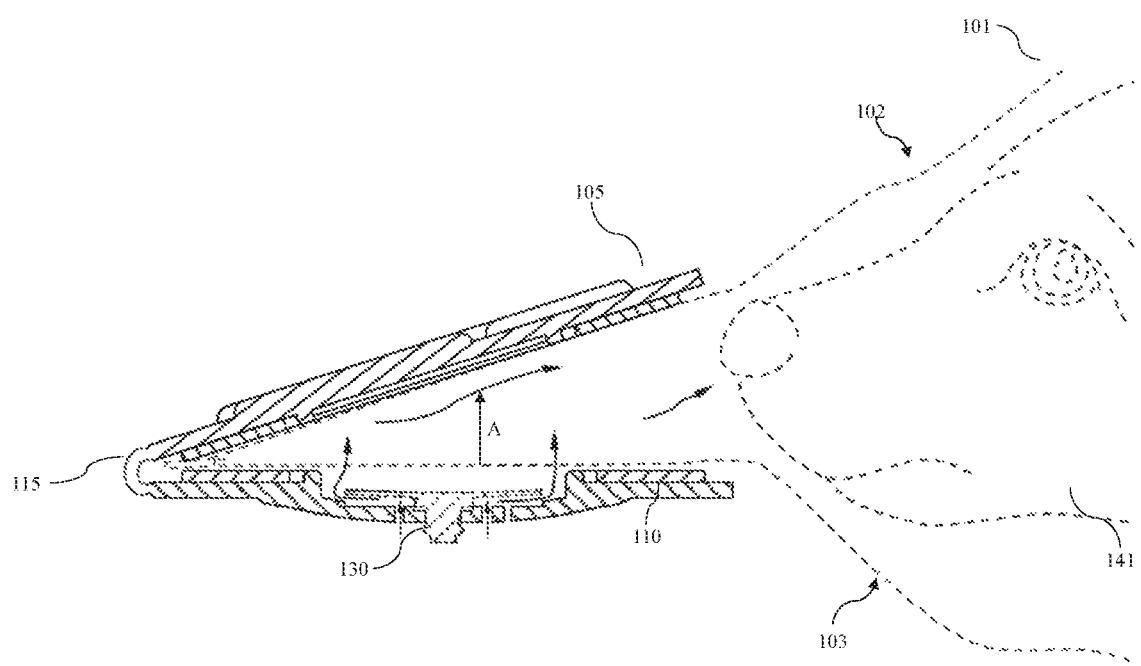
FIG. 12 is a side view of a system for preventing animal suffocation because of a bag, wherein the lung power of an animal acting on the one-way air flow valve causes air to flow from the outside environment to inside the bag, according to an example embodiment of the present invention.
Figure 13:
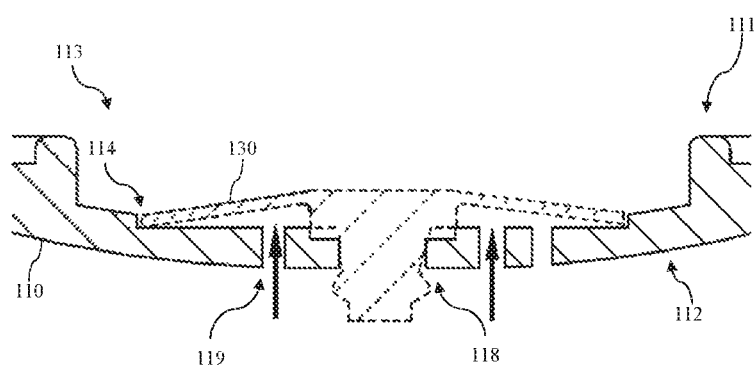
FIG. 13 is a cross-sectional side view of a system for preventing animal suffocation because of a bag, wherein the one-way air flow valve is in a first position, according to an example embodiment of the present invention.
Figure 14:
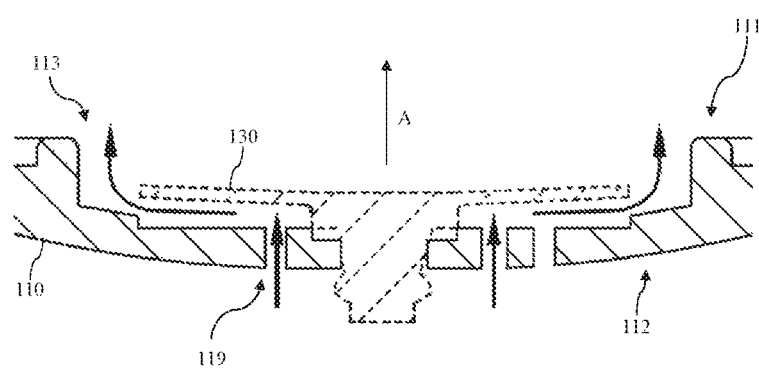
FIG. 14 is a cross-sectional side view of a system for preventing animal suffocation because of a bag, wherein the one-way air flow valve is in a second position, according to an example embodiment of the present invention.

In the present embodiment, the one-way air flow valve is an umbrella valve. The umbrella valve comprises an elastomeric diaphragm 131 and an elastomeric stem 132 formed integrally with the diaphragm. As illustrated in FIGS. 12-14, the outermost diameter of the umbrella valve is sized and shaped according to the inner diameter of the valve seat 114 to permit the stem of the umbrella valve to anchor the umbrella valve on the valve seat. As shown in FIG. 13, when the umbrella valve is mounted on the valve seat 114, the convex shaped diaphragm 131 flattens out against the valve seat and creates a sealing force to prevent air from flowing from inside the bag to outside the bag. In operation, an animal gets its head stuck in a bag or container that contains (or previously contained) salty, sugary or fatty snacks and foods. As the animal tries to breathe, the bag or container quickly forms a vacuum-like seal around the animal's head and quickly depletes the air within the bag or container. In a typical bag or container, the oxygen levels would quickly decline, and the carbon dioxide levels would quickly rise, however, as shown in FIGS. 12 and 14, the inward force (in the direction of arrowed line A) caused by the lung power of the animal acting on the umbrella valve lifts the diaphragm from the valve seat 114 to allow air to flow through the slots 119 and into the bag. As a result, suffocation of the animal 141 that has its head stuck in a bag or container is prevented. When the inward force is reduced, or stopped, the diaphragm returns to its sealing position, thereby stopping air from flowing from inside the bag to outside the bag. It should be appreciated that other one-way air flow valves can be used to allow air to flow from an outside environment into the bag when an inward force acts on the valve and pulls air from outside the bag inward inside the bag including ball check valves, duckbill valves, swing check valves, or any other suitable method known in the art, and such variations are within the spirit and scope of the claimed invention.

Figure 16:
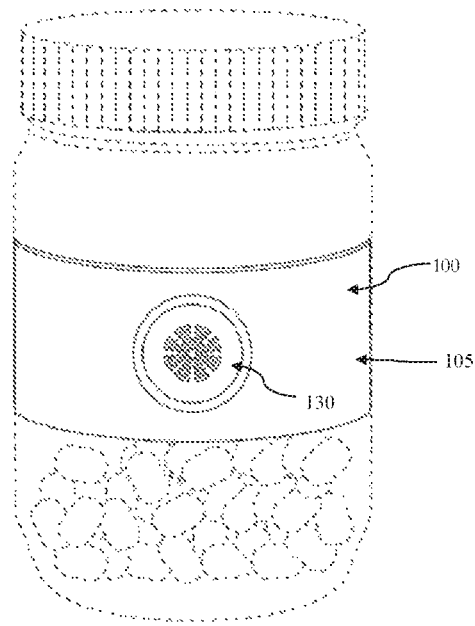
FIG. 16 is a perspective view of a system for preventing animal suffocation according to a second embodiment, wherein the system comprises a single panel attached to a container having a cylindrical shape; and, FIG. 17 is a perspective view of a system for preventing animal suffocation according to a second embodiment, wherein the system comprises a single panel attached to a container having a cylindrical shape, and wherein the system is preventing an animal from suffocating.
Figure 17:
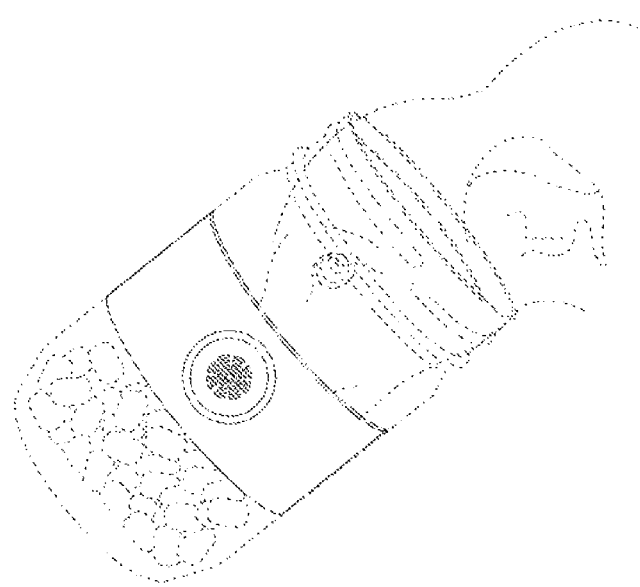

FIGS. 16 and 17 illustrate an attachment for a container, wherein the attachment prevents animal suffocation. In operation, the attachment 100 attaches to a container that can be varying in size and shape, that contains an adhesive disposed on a single panel, and that includes a one-way air flow valve. The single panel may be non-rigid, or flexible so that the panel can be attached to a panel having a curved surface. The one-way air flow valve 130 is configured such that air flow is allowed only in the container when an inward force acts on the valve and pulls air from outside the container inward while preventing the one-way air flow valve from allowing air to flow from the inside the container outward. The one-way air flow valve is positioned over a hole (not shown) on the container. In the present embodiment, the hole is positioned proximate to the one-way flow valve 130 so that air flows from the outside environment to inside the cylinder. This attachment prevents animal suffocation, by enabling the animal's lung power to create an inward force on the one-way air flow valve, causing the air to flow from the outside environment to inside the bag, providing oxygen for the animal, thus preventing animal suffocation. In operation, a user would first use a tool to dispose a hole (not shown) on the container. Next, the user would remove the backing from the adhesive that is on the panel. Next, the user will position the one-way flow valve 130 over the hole (not shown) such that the one-way flow valve is positioned proximate to the hole and use the adhesive to attach the panel to the container. Additionally, it should also be understood that the panel may be made from a variety of materials that allows the panel to be attached to a variety of different shapes and sizes of containers. In the present embodiment, the panel is a substantially rectangular shape body having flexible, or nonrigid type properties. However, other shapes and materials may be used and are also within the spirit and scope of the present invention. In operation, if an animal's head is stuck inside a container, the lung power of the animal's lungs will force air to move inside of the container thereby preventing suffocation of the animal.

Figure 15:
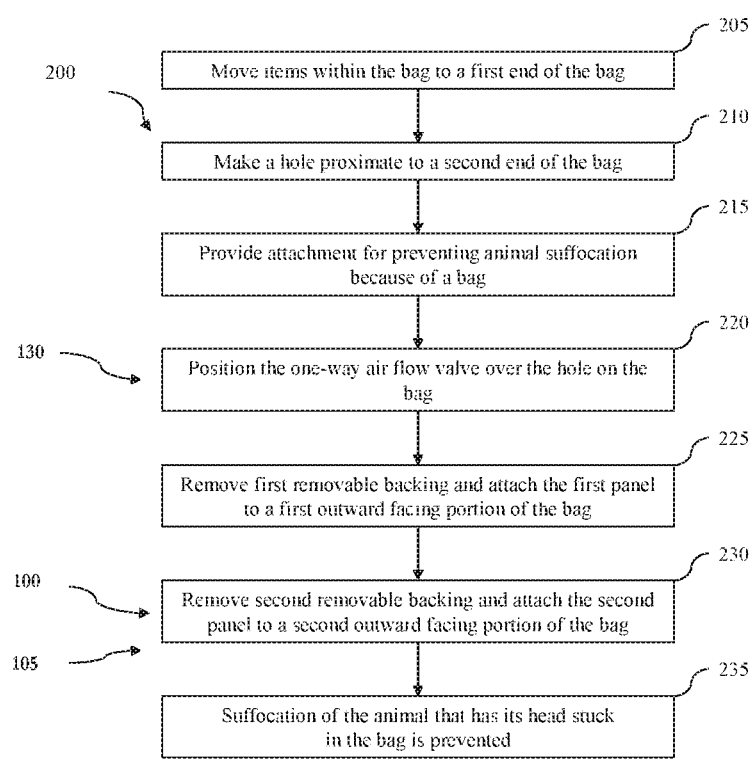
FIG. 15 is a flowchart describing the steps of the process for preventing animal suffocation because of a bag, according to an example embodiment of the present invention.

FIG. 15 is a flowchart describing the steps of the process for preventing animal suffocation because of a bag, according to an example embodiment of the present invention. The sequence of steps depicted is for illustrative purposes only and is not meant to limit the method in any way as it is understood that the steps may proceed in a different logical order, additional or intervening steps may be included, or described steps may be divided into multiple steps, without detracting from the invention.

The process 200 begins with step 205, moving items within the bag 101 to a first end of the bag. Although the examples in FIGS. 1-14 describe the method relative to a bag, those of skill in the art will appreciate that the invention may be adapted for use with other containers, receptacles, boxes, and enclosures configured for holding a product used in storage, packaging, and shipping.

In step 210, the process requires causing a hole to be proximate to a second end of the bag. The tool 140 for creating the hole 135 on the bag 101 is a hole puncher capable of perforating a circular hole through a typical potato chip bag that is made up of multiple layers of polymer materials; biaxially oriented polypropylene (BOPP) on the inside, low-density polyethylene (LDPE) in the middle, another middle layer of BOPP, and an outer layer of Surlyn®, a thermoplastic resin. It should be appreciated that the hole on the bag can have a variety of cross-sectional shapes and configurations, and such variations are within the spirit and scope of the claimed invention.

In step 215, the process requires providing an attachment 100 for the bag for preventing animal suffocation. As described above with respect to FIGS. 1-13, the attachment 100 comprises a first panel 105 and a second panel 110. The first panel has a substantially planar rectangular shaped body comprising a first side 106 and a second side 107 and the second panel has a substantially planar rectangular shaped body having a first side 111 and a second side 112. In the present embodiment, an annular ring 113 is embedded on the center of the first side 111 of the second panel. A planar annular valve seat 114 is formed about the periphery of the annular ring. The planar annular valve seat includes a circular hole 118 for receiving the one-way air flow valve, and a plurality of slots 119 for permitting air to flow into the bag. The attachment 100 further includes a hinge element 115 for hingedly attaching the first panel 105 with the second panel 110. In the present embodiment, the hinge element is a plastic living hinge that is integral with and of unitary construction with the first panel and the second panel. The first and panel and the second panel being hingedly attached and attached to the container of bag provides structural support to the bag or container to allow the one-way air flow valve to properly function. Specifically, the structural support from the first and second panel prevents a first outward facing portion 102 of the bag from sticking to a second outward facing portion of the bag 101 to provide ample clearance for the animal's lung power to pull air into the bag (further explained below). It should be appreciated that other suitable hinge mechanisms are within the spirit and scope of the claimed invention. In another embodiment (not shown), the attachment may be configured to comprise at least a first panel, without requiring the use of a second panel or hinge element. A first amount of adhesive 120 is disposed on the first side 106 of the first panel 105. The first amount of adhesive is configured to attach the first side of the first panel to a first outward facing portion 102 of the bag 101. A first removable backing 121 covers the first amount of adhesive 120. Similarly, a second amount of adhesive 125 is disposed on the first side 111 of the second panel 110. The second amount of adhesive is configured to attach the first side of the second panel to a second outward facing portion 103 of the bag 101. A second removable backing 126 covers the second amount of adhesive. In the present embodiment, the first amount of adhesive 120 and the second amount of adhesive 125 is a double-sided adhesive tape, however, it should be appreciated that other suitable adhesives are within the spirit and scope of the claimed invention. The attachment further includes a one-way air flow valve 130 that is integral with at least one of the first panel and the second panel. The one-way air flow valve 130 is configured to allow air to flow from an outside environment into the bag only when an inward force acts on the valve and pulls air from outside the bag inward inside the bag. As discussed above, the inward force defines a minimum threshold at least as great as an inhaling force caused by the animal 141 inhaling. Therefore, the one-way air flow valve 130 will prevent air from flowing into the bag 101 if the inward force does not act on the one-way air flow valve.

In step 220, the process requires positioning the one-way air flow valve over the hole 135 on the bag. In the present embodiment, as illustrated in FIGS. 6 and 7, the hole 135 is positioned proximate to the one-way flow valve 130 so that air flows from the outside environment to inside the bag. In step 225, the process requires removing the first removable backing 121 covering the first amount of adhesive 120 disposed on the first side 106 of the first panel 105 and attaching the first panel of the attachment to a first outward facing portion 102 of the bag 101. In step 230, the process requires removing the second removable backing 126 covering the second amount of adhesive 125 disposed on the first side 111 of the second panel 110 and attaching the second panel of the attachment to a second outward facing portion 103 of the bag 101.

In step 235, suffocation of the animal that has its head stuck in the bag is prevented by the inward force caused by the lung power of the animal acting on the one-way air flow valve causing air to flow from the outside environment to inside the bag. In the present embodiment, the one-way air flow valve is an umbrella valve. The umbrella valve comprises an elastomeric diaphragm 131 and an elastomeric stem 132 formed integrally with the diaphragm. As illustrated in FIGS. 12-14, the outermost diameter of the umbrella valve is sized and shaped according to the inner diameter of the valve seat 114 to permit the stem of the umbrella valve to anchor the umbrella valve on the valve seat. As shown in FIG. 13, when the umbrella valve is mounted on the valve seat 114, the convex shaped diaphragm 131 flattens out against the valve seat and creates a sealing force to prevent air from flowing from inside the bag to outside the bag. In operation, an animal gets its head stuck in a bag or container that contains (or previously contained) salty, sugary or fatty snacks and foods. As the animal tries to breathe, the bag or container quickly forms a vacuum-like seal around the animal's head and quickly depletes the air within the bag or container. In a typical bag or container, the oxygen levels would quickly decline, and the carbon dioxide levels would quickly rise, however, as shown in FIGS. 12 and 14, the inward force (in the direction of arrowed line A) caused by the lung power of the animal acting on the umbrella valve lifts the diaphragm from the valve seat 114 to allow air to flow through the slots 119 and into the bag. As a result, suffocation of the animal 141 that has its head stuck in a bag or container is prevented. When the inward force is reduced, or stopped, the diaphragm returns to its sealing position, thereby stopping air from flowing from inside the bag to outside the bag. It should be appreciated that other one-way air flow valves can be used to allow air to flow from an outside environment into the bag when an inward force acts on the valve and pulls air from outside the bag inward inside the bag including ball check valves, duckbill valves, swing check valves, or any other suitable method known in the art, and such variations are within the spirit and scope of the claimed invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A system for preventing animal suffocation because of a bag, the system comprising:
   an attachment for the bag, the attachment comprising:
   a first panel having a first side and a second side;
   a second panel having a first side and a second side;
   a hinge element hingedly attaching the first panel with the second panel;

a first amount of adhesive disposed on the first side of the first panel, wherein the first amount of adhesive is configured to attach the first side of the first panel to a first outward facing portion of the bag;

a second amount of adhesive disposed on the first side of the second panel, wherein the second amount of adhesive is configured to attach the first side of the second panel to a second outward facing portion of the bag; and, a one-way air flow valve integral with at least one of the first panel and the second panel, wherein the one way valve is configured to allow air to flow from an outside environment into the bag only when an inward force acts on the valve and pulls air from outside the bag inward inside the bag; and, wherein the one-way air flow valve prevents air from flowing from inside the bag to outside the bag.

2. The system of claim 1, wherein a hole is on the bag positioned proximate to the one-way flow valve so that air flows from the outside environment to inside the bag.

3. The system of claim 1, wherein the system further includes a tool for creating a hole on the bag positioned proximate to the one-way flow valve so that air flows from the outside environment to inside the bag.

4. The system of claim 1, wherein the one-way air flow valve is configured to prevent air from flowing into the bag if the inward force does not act on the one-way air flow valve.

5. The system of claim 1, wherein the inward force defines a minimum threshold at least as great as an inhaling force caused by the animal inhaling.

6. The system of claim 1, wherein a first removable backing covers the first amount of adhesive.

7. The system of claim 1, wherein a second removable backing covers the second amount of adhesive.

8. The system of claim 1, wherein the one-way air flow valve is an umbrella valve.

9. An attachment for a container, wherein when the attachment prevents animal suffocation, the attachment comprising:

at least a first panel having a first side and a second side;

a first amount of adhesive disposed on the first side of the first panel, wherein the first amount of adhesive is configured to attach the first side of the first panel to a first outward facing portion of the container; and, a one-way air flow valve integral with at least the first panel, wherein the one way is configured to allow air to flow into the container only when an inward force acts on the valve and pulls air from outside the container inward inside the container; and, wherein the one-way air flow valve prevents air from flowing from inside the container to outside the container.

10. The attachment of claim 9, wherein the one-way air flow valve is configured to prevent air from flowing into the container if the inward force does not act on the one-way air flow valve.

11. The attachment of claim 9, wherein the inward force defines a minimum threshold at least as great as an inhaling force caused by the animal inhaling.

12. The attachment of claim 9, wherein a first removable backing covers the first amount of adhesive.

13. The attachment of claim 9, wherein the one-way air flow valve is an umbrella valve.

* * * * *